A. E. T. YAROSCAK.
POT PROTECTOR.
APPLICATION FILED JAN. 5, 1915.
1,227,356.
Patented May 22, 1917.
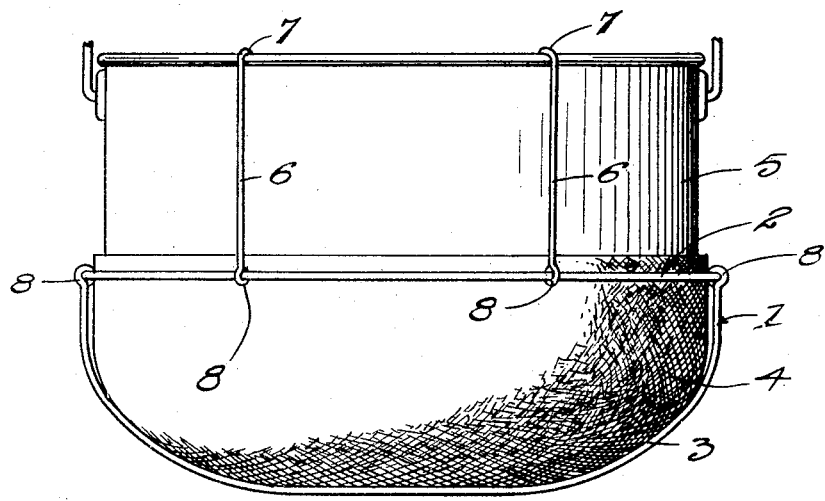
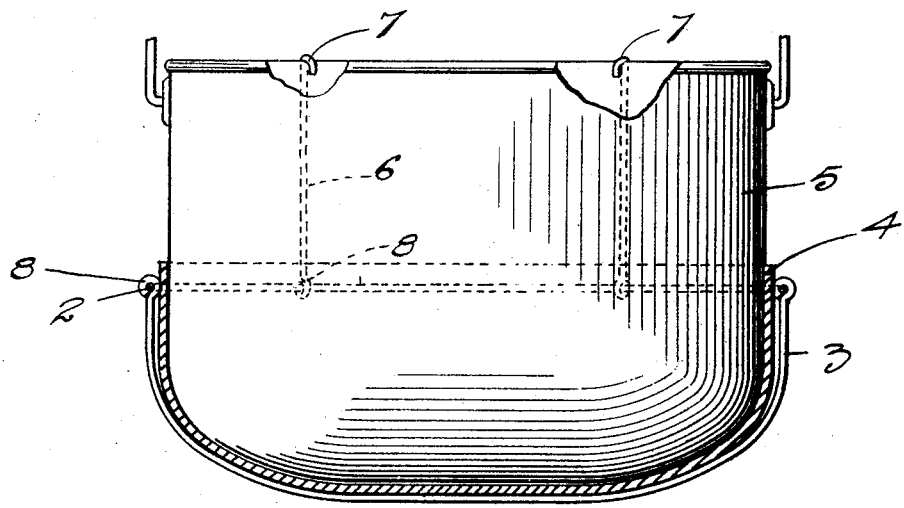
Witnesses
C. R. Beall
Rob. Meyer
Inventor
A. E. T. Yaroscak.
By
[signature]
Attorney

UNITED STATES PATENT OFFICE.

ANNA E. T. YAROSCAK, OF CHISHOLM, MINNESOTA.

POT-PROTECTOR.

1,227,356.  Specification of Letters Patent.  Patented May 22, 1917.

Application filed January 5, 1915. Serial No. 640.

*To all whom it may concern:*

Be it known that I, ANNA E. T. YAROSCAK, a citizen of the United States, residing at Chisholm, in the county of St. Louis and State of Minnesota, have invented certain new and useful Improvements in Pot-Protectors; and I do hereby declare the following to be a full, clear, and exact description of the invention, such as will enable others skilled in the art to which it appertains to make and use the same.

This invention relates to pot protectors, and the primary object of the invention is to provide a fire-proof shell for receiving the bottom of an ordinary cooking receptacle or pot, which will prevent the burning and smoking of the bottom of the cooking receptacle or pot.

Another object of this invention is to provide a supporting frame constructed of wire which supports a fire-proof sheet shaped to conform to the configuration of the bottom or lower section of a cooking receptacle or pot for receiving the pot therein.

With the foregoing and other objects in view, this invention consists in such novel features of construction, combination and arrangement of parts as will be hereinafter more fully described, illustrated in the accompanying drawings, and claimed.

In describing the invention in detail, reference will be had to the accompanying drawings wherein like characters designate like or corresponding parts throughout the several views, and in which:

Figure 1 is a side elevation of the improved pot protector, showing a pot applied thereto, and Fig. 2 is a section of the improved protector.

Referring more particularly to the drawings, 1 designates the supporting frame of the pot protector as an entirety, which is composed of a length of wire bent to assume substantially a circular shape and which has secured thereto cross supporting braces 3, which are bent downwardly and upwardly to assume substantially a semi-circular shape and which extend transversely to the plane of the circular supporting ring 2. The circular supporting ring 2 which is positioned in a horizontal plane, and the semi-circular supporting cross rod 3 form a frame-work for supporting a shell 4. The shell 4 is constructed of any suitable fire-proof material, such as sheet asbestos, or other similar fire-proof material, and it is shaped to conform to the configuration of the lower section or bottom of a cooking receptacle or pot 5.

The circular supporting ring or wire 2 has secured thereto at spaced intervals about its length a plurality of vertically extending rods 6, which have their upper ends curved upon themselves to form hooks, as is shown at 7. The hooks 7 are adapted for engaging the upper marginal edge of the cooking receptacle or pot 5, for securely holding the frame formed by the ring 2 and the cross bars 3 connected to the pot structure. The wire 3 and vertical rods 6 are connected to the substantially circular supporting wire 2 by having their ends rolled upon themselves for forming engaging eyes, as is indicated at 8 in the drawing.

In applying the improved pot protector, the vertical rods 6 are sprung outwardly, owing to the resiliency thereof, and the pot or cooking receptacle 5 is inserted in the fire-proof shell 4, after which the vertical rods 6 are sprung into place, causing the hooks 7 to engage the upper marginal edge of the pot or cooking receptacle, as is clearly shown in Fig. 2 of the drawing, which securely connects the ring 2 and the shell 4 carried thereby to the bottom of the pot or cooking receptacle 5 for preventing the burning or smoking of the bottom of the pot or cooking receptacle.

In reducing the invention to practice such minor features of construction, combination and arrangement of parts may necessitate alterations to which the patentee is entitled, providing such alterations are comprehended within the scope of what is claimed.

What is claimed is:—

A cooking utensil protector comprising a supporting structure formed of wire, said supporting structure including a main ring circular in shape and arranged in a horizontal plane, a plurality of cross braces semi-circular in shape and secured by their ends to the horizontal ring at diametrically opposite points defining a frame, a semi-circular shell formed of insulating material positioned in said frame, its upper edge projecting beyond the horizontal ring, a plurality of vertically arranged rods having one of their ends curved upon themselves to form hooks, their opposite ends secured at spaced intervals about the length of a horizontal ring, said hook ends adapted to engage the upper marginal edge of a cooking receptacle when positioned in the shell thus holding the supporting frame and shell around the receptacle.

In testimony whereof I affix my signature in presence of two witnesses.

ANNA E. T. YAROSCAK.

Witnesses:
CECIL HEALY,
GEO. K. TRASK.

Copies of this patent may be obtained for five cents each, by addressing the "Commissioner of Patents, Washington, D. C."